United States Patent
Fukasawa et al.

(10) Patent No.: US 11,386,312 B2
(45) Date of Patent: Jul. 12, 2022

(54) IMAGE FORMING APPARATUS

(71) Applicant: KYOCERA Document Solutions Inc., Osaka (JP)

(72) Inventors: Yuki Fukasawa, Osaka (JP); Atsushi Kimura, Osaka (JP); Shin Ishikawa, Osaka (JP); Hikaru Miyaji, Osaka (JP); Kosuke Nakajima, Osaka (JP); Yosuke Morishita, Osaka (JP); Masaaki Nishihara, Osaka (JP)

(73) Assignee: Kyocera Document Solutions, Inc.

( * ) Notice: Subject to any disclaimer, the term of this patent is extended or adjusted under 35 U.S.C. 154(b) by 29 days.

(21) Appl. No.: 17/017,445

(22) Filed: Sep. 10, 2020

(65) Prior Publication Data
US 2021/0081731 A1    Mar. 18, 2021

(30) Foreign Application Priority Data
Sep. 12, 2019    (JP) .............................. JP2019-165863

(51) Int. Cl.
*G06K 15/02* (2006.01)

(52) U.S. Cl.
CPC ....... *G06K 15/1878* (2013.01); *G06K 15/027* (2013.01)

(58) Field of Classification Search
CPC .................... G06K 15/1878; G06K 15/027
USPC ........................ 358/504, 1.9, 1.15
See application file for complete search history.

(56) References Cited

U.S. PATENT DOCUMENTS

2004/0174574 A1*   9/2004   Okuda .............. H04N 1/00023
                                                     358/504

FOREIGN PATENT DOCUMENTS

JP            2001-287406           10/2001

* cited by examiner

*Primary Examiner* — Quang N Vo

(57) ABSTRACT

An image forming apparatus includes a print engine, a sheet transportation unit, an optical sensor, and an image processing unit. The print engine is configured to physically print an image to be printed on a print sheet. The sheet transportation unit is configured to transport the print sheet along a predetermined transportation path. The optical sensor is arranged so as to face the transportation path, and configured to detect a color of a test chart on a colored print sheet transported along the transportation path. The image processing unit is configured to perform color correction of the image to be printed on the colored print sheet, on the basis of the detected color of the test chart on the colored print sheet so as to restrain color change of the image due to a surface color of the colored print sheet.

6 Claims, 3 Drawing Sheets

IMAGE FORMING APPARATUS

CROSS-REFERENCE TO RELATED APPLICATIONS

This application relates to and claims priority rights from Japanese Patent Application No. 2019-165863, filed on Sep. 12, 2019, the entire disclosures of which are hereby incorporated by reference herein.

BACKGROUND

1. Field of the Present Disclosure

The present disclosure relates to an image forming apparatus.

2. Description of the Related Art

In an image forming apparatus (in particular, of inkjet type), when printing is performed on a colored print sheet (i.e. having a chromatic color such as reddish color, bluish color, yellowish color, or greenish color), color representation of an image printed on the colored print sheet may not be user's desired color representation due to a surface color of the colored print sheet.

An image forming apparatus registers as a template a surface color of a colored print sheet in advance, and when using the colored print sheet for print, the image forming apparatus automatically adjusts a color density of a print image on the basis of the surface color registered as a template.

However, in the aforementioned image forming apparatus, if an aging change appears on the apparatus, colorant such as ink, and the colored print sheet when the automatic adjustment is performed in accordance with a fixed characteristic based on the surface color registered in the past, then color representation of an image on a printed matter using the colored print sheet may be improperly adjusted.

SUMMARY

An image forming apparatus according to an aspect of the present disclosure includes a print engine, a sheet transportation unit, an optical sensor, and an image processing unit. The print engine is configured to physically print an image to be printed on a print sheet. The sheet transportation unit is configured to transport the print sheet along a predetermined transportation path. The optical sensor is arranged so as to face the transportation path, and configured to detect a color of a test chart on a colored print sheet transported along the transportation path. The image processing unit is configured to perform color correction of the image to be printed on the colored print sheet, on the basis of the detected color of the test chart on the colored print sheet so as to restrain color change of the image due to a surface color of the colored print sheet.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
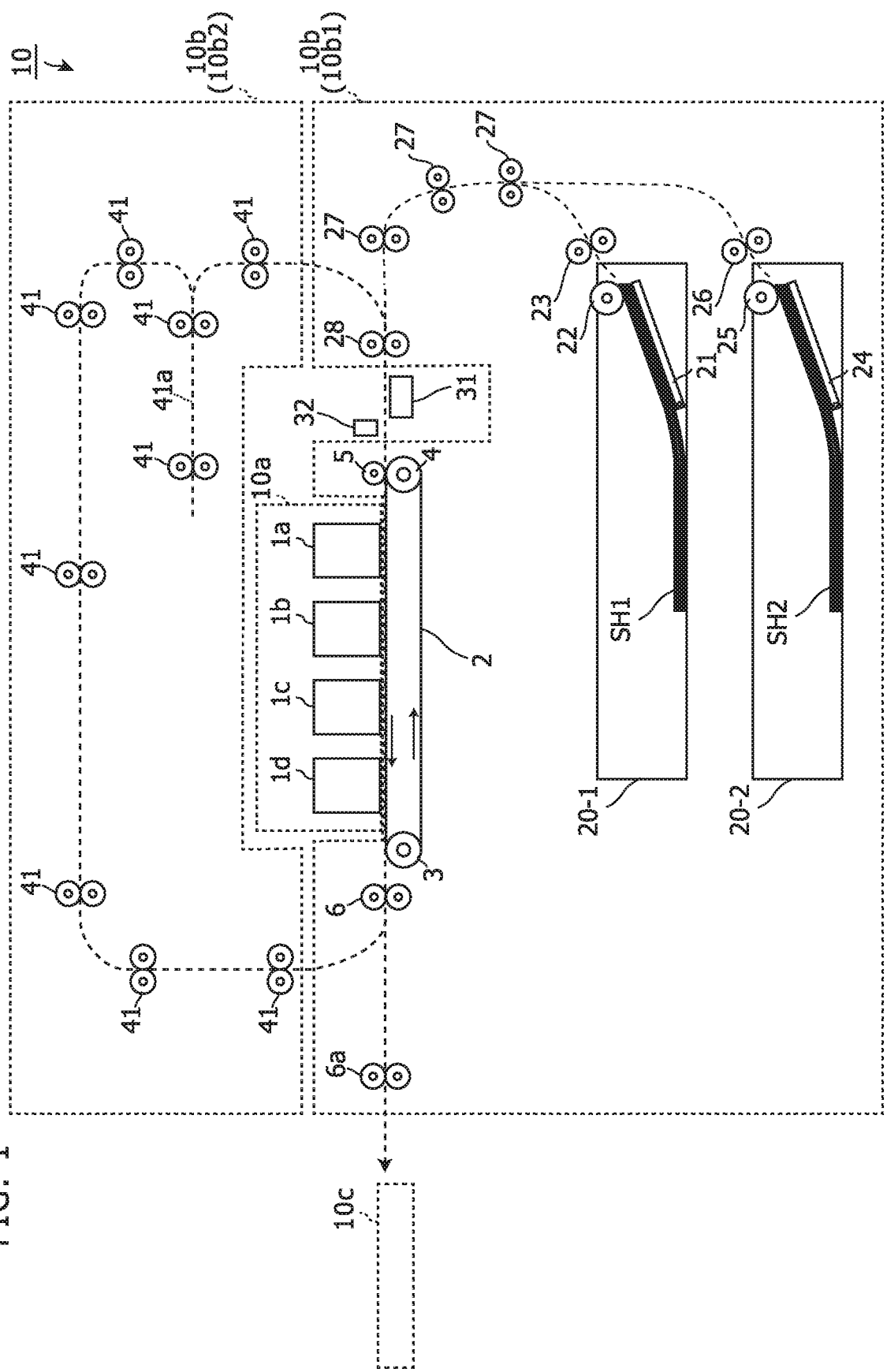
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. The image forming apparatus 10 in this embodiment is an apparatus such as printer, copier, facsimile machine or multi function peripheral.

The image forming apparatus 10 includes a print engine 10a and a sheet transportation unit 10b. The print engine 10a physically forms an image to be printed on a print sheet (print paper sheet or the like). In this embodiment, the print engine 10a is a line-type inkjet print engine. Alternatively, the print engine 10a may be an electrophotographic print engine.

The print sheet is a white print sheet or a colored print sheet.

In this embodiment, the print engine 10a includes line-type inkjet recording units 1a to 1d corresponding to four ink colors: Cyan, Magenta, Yellow, and Black. In this embodiment, each inkjet recording unit 1a, 1b, 1c or 1d includes one or plural head units.

The sheet transportation unit 10b transports the print sheet to the print engine 10a along a predetermined transportation path, and transports the print sheet after printing from the print engine 10a to a predetermined output destination (here, an output tray 10c or the like).

The sheet transportation unit 10b includes a main sheet transportation unit 10b1 and a circulation sheet transportation unit 10b2. In duplex printing, the main sheet transportation unit 10b1 transports to the print engine 10a a print sheet to be used for printing of a first-surface page image, and the circulation sheet transportation unit 10b2 transports the print sheet from a posterior stage of the print engine 10a to a prior stage of the print engine 10a with detaining a predetermined number of print sheets. Thus, the circulation sheet transportation unit 10b2 is used for duplex printing.

In this embodiment, the main sheet transportation unit 10b1 includes (a) a circular-type transportation belt 2 that is arranged so as to be opposite to the print engine 10a and transports a print sheet, (b) a driving roller 3 and a driven roller 4 around which the transportation belt 2 is hitched, (c) a nipping roller 5 that nips the print sheet with the transportation belt 2, and (d) output roller pairs 6 and 6a.

The driving roller 3 and the driven roller 4 rotate the transportation belt 2. The nipping roller 5 nips an incoming print sheet transported from a sheet feeding cassette 20-1 or 20-2 mentioned below, and the nipped print sheet is transported by the transportation belt 2 to printing positions of the inkjet recording units 1a to 1d in turn, and on the print sheet, images of respective colors are printed by the inkjet recording units 1a to 1d. Subsequently, after the color printing, the print sheet is outputted by the output roller pairs 6 and 6a to an output tray 10c or the like.

Further, the main sheet transportation unit 10b1 includes plural sheet feeding cassettes 20-1 and 20-2. The sheet feeding cassettes 20-1 and 20-2 store print sheets SH1 and SH2, and push up the print sheets SH1 and SH2 using lift plates 21 and 24 so as to cause the print sheets SH1 and SH2 to contact with pickup rollers 22 and 25, respectively. The print sheets SH1 and SH2 put on the sheet feeding cassettes 20-1 and 20-2 are picked up to sheet feeding rollers 23 and 26 by the pickup rollers 22 and 25 sheet by sheet from the upper sides, respectively. The sheet feeding rollers 23 and 26 are rollers that transport the print sheets SH1 and SH2 sheet by sheet fed by the pickup rollers 22 and 25 from the sheet feeding cassettes 20-1 and 20-2 onto a transportation path. A transportation roller 27 is a transportation roller on the transportation path common to the print sheets SH1 and SH2 transported from the sheet feeding cassettes 20-1 and 20-2.

For example, in one of the sheet feeding cassettes 20-1 and 20-2, a white print sheet is stored; and in the other of the sheet feeding cassettes 20-1 and 20-2, a colored print sheet is stored. On each of the sheet feeding cassettes 20-1 and 20-2, for example, a user specifies to a controller 61 mentioned below which of white and colored print sheets is stored.

When performing duplex printing, the circulation sheet transportation unit 10b2 returns the print sheet from a predetermined position in a downstream side of the print engine 10a to a predetermined position in an upstream side of the print engine 10a (here, to a predetermined position in an upstream side of a line sensor 31 mentioned below). The circulation sheet transportation unit 10b2 includes a transportation roller 41, and a switch back transportation path 41a that reverses a movement direction of the print sheet in order to change a surface that should face the print engine 10a among surfaces of the print sheet from the first surface to the second surface of the print sheet.

Further, the image forming apparatus 10 includes a line sensor 31 and a sheet detecting sensor 32.

The line sensor 31 is an optical sensor that is arranged along a direction perpendicular to a transportation direction of the print sheet, and detects positions of both end edges of the print sheet. For example, the line sensor 31 is a CIS (Contact Image Sensor). In this embodiment, the line sensor 31 is arranged at a position between the registration roller 28 and the print engine 10a.

The sheet detecting sensor 32 is an optical sensor that detects that a top end of the print sheet SH1 or SH2 passes through a predetermined position on the transportation path.

The line sensor 31 detects the positions of the both end edges at a time point that the top end of the print sheet SH1 or SH2 is detected by the sheet detecting sensor 32.

Further, the line sensor 31 is an optical sensor that is arranged so as to face the transportation path and detects a color of a test chart on a colored print sheet transported on the transportation path. In this embodiment, the line sensor 31 is arranged at a position in an upstream side of the print engine 10a in the transportation path. Here, the test chart is an image to measure a change of color representation of an image on a printed matter due to a surface color of a colored print sheet, and here includes toner respective patch images of toner colors CMYK. Further, for each toner color, the test chart includes plural patch images that have respective plural gradation levels.

As shown in FIG. 1, the print engine 10a is arranged in one of an upward part of the transportation path and a downward part of the transportation path (here, in the upward part); the line sensor 31 is arranged in the other of the upward part of the transportation path and the downward part of the transportation path (here, in the downward part); and the circulation transportation unit 10b2 transports the print sheet from the downstream side of the print engine 10a to the upstream side of the line sensor 31 with changing an orientation of the print sheet in a switch back manner. Thus, the print sheet for the test chart is transported in a transportation manner same as one in duplex printing, and consequently a color of the test chart printed on one of the surfaces of the print sheet can be detected by the line sensor 31.

Figure 2:
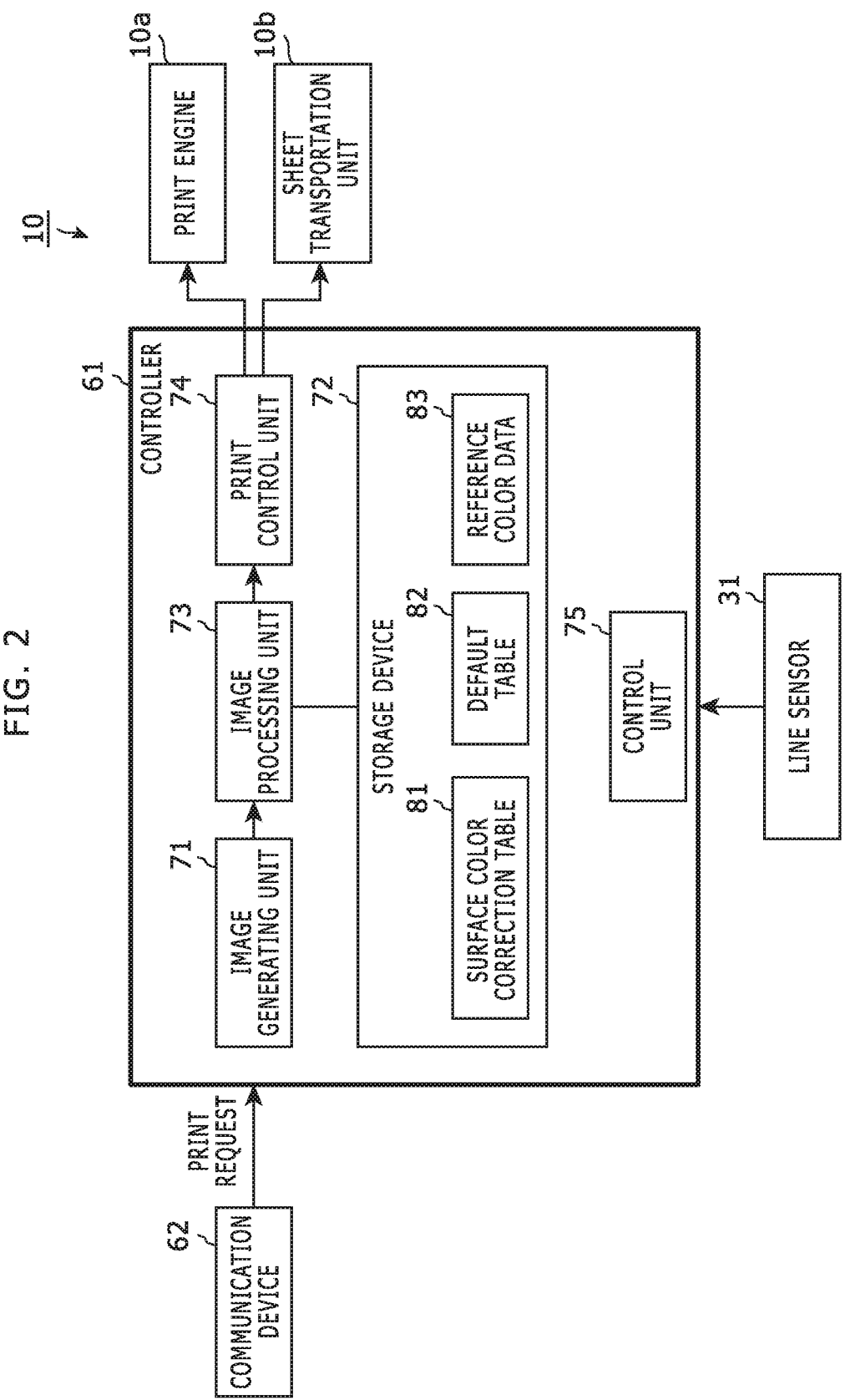
FIG. 2 shows a block diagram that indicates an electronic configuration of the image forming apparatus 10 in the embodiment according to the present disclosure.

FIG. 2 shows a block diagram that indicates an electronic configuration of the image forming apparatus 10 in the embodiment according to the present disclosure.

As shown in FIG. 2, the image forming apparatus 10 further includes a controller 61 and a communication device 62.

The control unit 61 performs image processing, controlling the print engine 10a and the sheet transportation unit 10b, and the like. The communication device 62 is a network interface for example, and receives a print request (e.g. a request including print data described in a page description language) from a host device.

The controller 61 includes an image generating unit 71, a storage device 72, an image processing unit 73, a print control unit 74, and a control unit 75. In the storage device 72, a surface color correction table 81, a default table 82, and reference color data 83 are stored.

Specifically, the controller 61 includes a computer that executes a predetermined program, an ASIC (Application Specific Integrated Circuit) that performs a specific data process, and/or the like as a processing unit, and this processing unit acts as the image generating unit 71, the image processing unit 73, the print control unit 74, and the control unit 75. The storage device 72 is a non-volatile storage device such as flash memory.

The image generating unit 71 generates from the print data in the print request raster image data of an image to be printed.

The image processing unit 73 performs a predetermined image process for the aforementioned image data. Specifically, the image processing unit 73 performs image rotation, image combination, color conversion, color correction, half toning and/or the like, as the predetermined image process.

In particular, the image processing unit 73 performs color correction of the image to be printed (i.e. the image specified by the user's print request), on the basis of the color detected by the line sensor 31 of the test chart on the colored print sheet so as to restrain a color change of the image due to the surface color of the colored print sheet.

For example, if the colored print sheet has a green color, then a green color component in the image to be printed (i.e. one or more corresponding toner color components) are reduced in the color correction.

The print control unit 74 controls the print engine 10a in accordance with the image data after the image process and thereby performs printing, and controls the sheet transportation unit 10b and thereby performs transportation of a print sheet used for the printing.

Further, in this embodiment, the print control unit 74 has an automatic centering function that (a) determines as a sheet center actual position a center position of a print sheet on the basis of the positions of both end edges of the print sheet detected by the line sensor 31, and (b) adjusts a center position of an image to be printed, on the basis of a difference from the sheet center actual position. Therefore, the print control unit 74 causes the print engine 10a to perform printing of the image so as to move the image in a primary scanning direction by a difference between a reference center position of the print engine 10a and the sheet center actual position.

Using the print control unit 74, the control unit 75 (a) causes the print engine 10a to print a predetermined test chart on a colored print sheet, (b) causes the circulation transportation unit 10b2 to transport the colored print sheet on which the test chart has been printed to the upstream side of the line sensor 31, and (c) causes the line sensor 31 to detect a color of the test chart. The image processing unit 73 performs color correction of an image to be printed, on the basis of the detected color of the test chart on the colored print sheet so as to restrain the color change.

Further, in this embodiment, the surface color correction table 81 indicates a relationship between a color of the test chart and a color correction characteristic. The image processing unit 73 refers to the surface color correction table 81 and thereby determines a color correction characteristic corresponding to the detected color of the test chart, and performs the color correction in accordance with the determined color correction characteristic. The correction characteristic includes a correction coefficient of each gradation level for each toner color, and the image processing unit 73 multiplies the corresponding gradation level in the image by the correction coefficient and thereby derives the image to be printed that the color correction has been performed for.

Further, in this embodiment, the default table 82 indicates a color correction characteristic of the image for a case that a white print sheet is used, and the reference color data 83 indicates a reference color of the test chart (i.e. a typical color of the test chart printed on a white print sheet). The control unit 75 generates a new surface color correction table on the basis of the detected color of the test chart and the reference color, and renews the surface color correction table 81 stored by the storage device 72 with the newly generated surface color correction table. In this embodiment, the control unit 75 derives a difference value between the new surface color correction table and the surface color correction table 81 stored by the storage device 72; and if the difference value is equal to or larger than a predetermined threshold value, the control unit 75 performs the renewal of the surface color correction table 81. If the test chart includes patch images of plural gradation levels, the reference color data 83 indicates plural reference colors corresponding to the plural gradation levels for each toner color. Further, the aforementioned difference value is determined as a total of errors at the plural gradation levels from the surface color correction table 81 stored by the storage device 72, a largest value of errors at the plural gradation levels from the surface color correction table 81 stored by the storage device 72, or the like.

Furthermore, the surface color correction table 81 and the default table 82 have the aforementioned relationship and the aforementioned color correction characteristic, and the color correction is independently performed in accordance with the color correction characteristic for each toner color.

Figure 3:
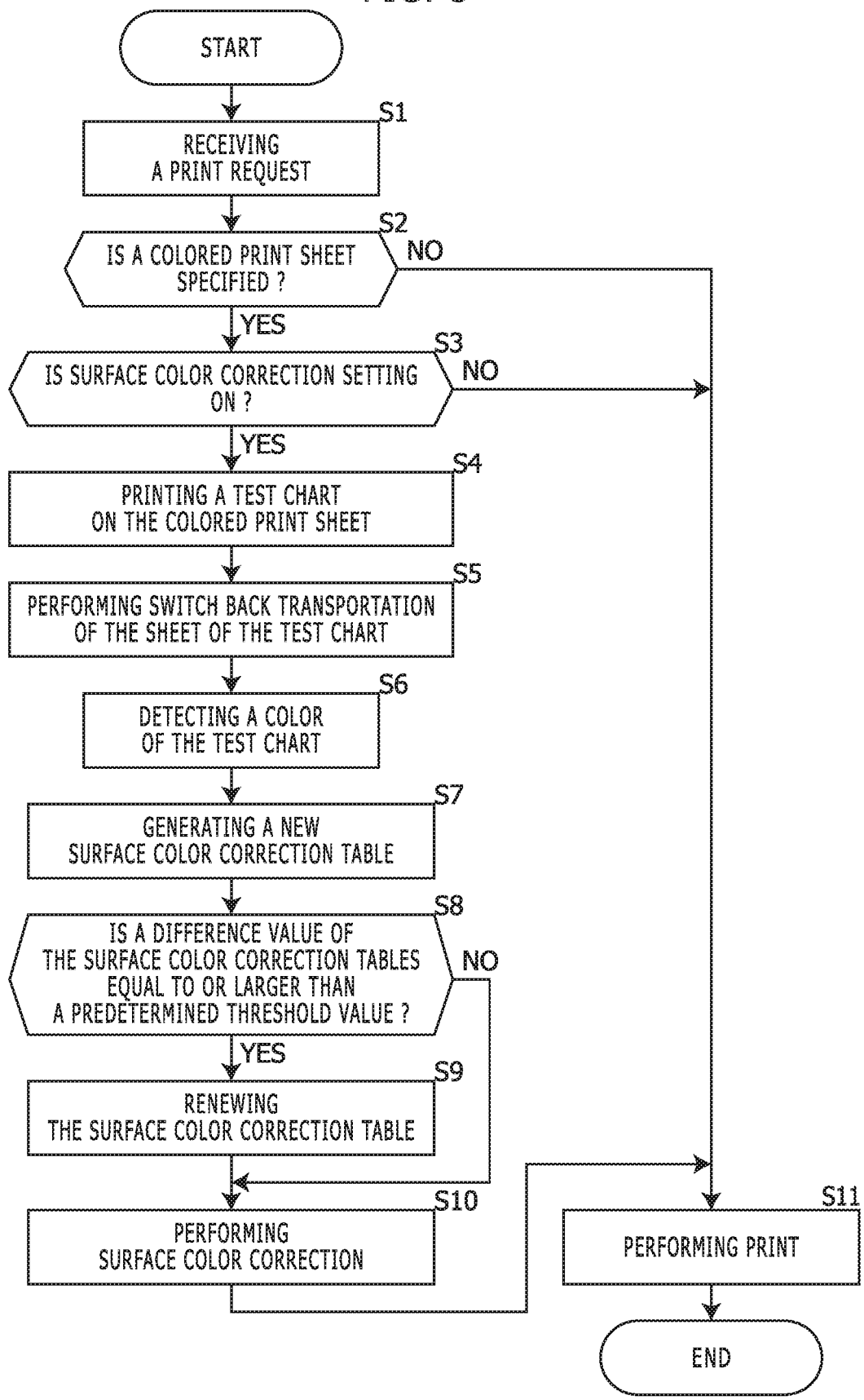
FIG. 3 shows a flowchart that explains a behavior of the image forming apparatus 10 shown in FIGS. 1 and 2.

The following part explains a behavior of the image forming apparatus 10. FIG. 3 shows a flowchart that explains a behavior of the image forming apparatus 10 shown in FIGS. 1 and 2.

When the control unit 75 of the controller 61 receives a print request using the communication device 62 (in Step S1), the control unit 75 determines whether a colored print sheet is specified as a print sheet to be used for printing in the print request or not (in Step S2).

For example, if a sheet feeding cassette that stores a colored print sheet is selected in the print request, then it is determined that a colored print sheet is specified as a print sheet to be used for printing.

If a colored print sheet is specified as a print sheet to be used for printing in the print request, then the control unit 75 determines whether or not surface color correction setting is ON in the print request or the like (in Step S3).

If the surface color correction setting is ON in the print request or user setting, then the control unit 75 controls the sheet transportation unit 10b using the print control unit 74 and thereby transports the specified colored print sheet from the sheet feeding cassette 20-i to the print engine 10a and causes the print engine 10a to print the test chart on this colored print sheet (in Step S4).

Subsequently, the control unit 75 controls the sheet transportation unit 10b using the print control unit 74 and thereby causes the circulation sheet transportation unit 10b2 to transport to an arrangement position of the line sensor 31 the colored print sheet on which the test chart has been printed (in Step S5).

When the colored print sheet passes through the position of the line sensor 31, the line sensor 31 detects a color of the test chart on the colored print sheet (in Step S6), and outputs an electric signal that indicates the detected color. Afterward, the colored print sheet passes through a position in the downward part of the print engine 10a and is outputted to the output tray 10c or the like.

Upon detecting the color of the test chart, the control unit 75 generates a new surface color correction table in the aforementioned manner (in Step S7).

For example, if the test chart is printed without the color correction for an image of the test chart, then the correction coefficient of each gradation level in the color correction characteristic is set as a ratio between a detected level of the color of the patch image corresponding to the gradation level and a level of a corresponding reference color, and thereby the new surface color correction table is generated.

For example, if the test chart is printed after the color correction for an image of the test chart, then the correction coefficient of each gradation level in the color correction characteristic in the current surface color correction table is adjusted on the basis of a ratio between a detected level of the color of the patch image corresponding to the gradation level and a level of a corresponding reference color, and thereby the new surface color correction table is generated.

Subsequently, the control unit 75 derives a difference value between the new surface color correction table and the surface color correction table 81 stored by the storage device 72 (in Step S8). Only if the difference value is equal to or larger than a predetermined threshold value, then the control unit 75 renews the surface color correction table 81 with the new surface color correction table (in Step S9).

Further, the control unit 75 provides print data in the print request to the image generating unit 71, causes the image generating unit 71 to generate raster image data, and causes the image processing unit 73 to perform color correction for the raster image data (i.e. an image to be printed) on the basis of the current surface color correction table 81 (in Step S10).

Furthermore, the control unit 75, using the print control unit 74, (a) causes the sheet transportation unit 10b to perform transportation of a colored print sheet for the printing of the image specified by the print request (i.e. the same as the colored print sheet for the test chart), and (b) causes the print engine 10a to print the image after the color correction on the colored print sheet (in Step S11). Thus, in this case, the test chart is not printed on this colored print sheet, and the color correction is performed on the basis of the surface color correction table 81.

Contrarily, if a colored print sheet is not specified in the print sheet in Step S2 or if the surface color correction setting is not ON, then the image processing unit 73 performs the color correction for the generated raster image data (i.e. an image to be printed) on the basis of the default table 82, and the print control unit 74 (*a*) causes the sheet transportation unit 10*b* to perform a white or colored print sheet used for the printing of the image specified by the print request, and (b) causes the print engine 10*a* to print the image after the color correction on the print sheet (in Step S11). Thus, in this case, the test chart is not printed on this colored print sheet, and the color correction is performed on the basis of the default table 82 without the surface color correction.

As mentioned, in the aforementioned embodiment, the print engine 10*a* physically prints an image to be printed on a print sheet. The sheet transportation unit 10*b* transports the print sheet along a transportation path. The line sensor 31 is arranged so as to face the transportation path and detects a color of a test chart on a colored print sheet transported on the transportation path. The image processing unit 73 performs color correction of the image to be printed on the colored print sheet, on the basis of the detected color of the test chart on the colored print sheet so as to restrain color change of the image due to a surface color of the colored print sheet.

Consequently, the color correction is performed on the basis the color of the test chart printed immediately before the printing of an image specified by a user on a colored print sheet such that the test chart is obtained by printing its image on a colored print sheet of the same type as a type of the colored print sheet for the image to be printed, and therefore, even if the aforementioned aging change occurs, the color correction is performed so as to provide a proper color representation of an image on a printed matter using such colored print sheet.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, an optical sensor that detects a color of the test chart may be installed at a position in a downstream side of the print engine 10*a*, instead of the line sensor 31.

What is claimed is:

1. An image forming apparatus, comprising:
   a print engine configured to physically print an image to be printed on a print sheet;
   a sheet transportation unit configured to transport the print sheet along a predetermined transportation path;
   an optical sensor arranged so as to face the transportation path, and configured to detect a color of a test chart on a colored print sheet transported along the transportation path;
   a control unit;
   a storage device configured to store a surface color correction table and a reference color data that indicates a reference color of the test chart; and
   an image processing unit configured to perform color correction of the image to be printed on the colored print sheet, on the basis of the detected color of the test chart on the colored print sheet so as to restrain color change of the image due to a surface color of the colored print sheet; wherein the image processing unit (a) determines a color correction characteristic corresponding to the detected color of the test chart in accordance with the surface color correction table that indicates a relationship between a color of the test chart and a color correction characteristic, and (b) performs the color correction in accordance with the determined color correction characteristic; wherein the control unit generates a new surface color correction table on the basis of the detected color of the test chart and the reference color, and renews the surface color correction table stored by the storage device with the newly generated surface color correction table.

2. The image forming apparatus according to claim 1, further comprising a control unit;
   wherein the optical sensor is a line sensor arranged at a predetermined position in an upstream side of the print engine in the transportation path;
   the sheet transportation unit comprises a circulation sheet transportation unit that transports the print sheet from a downstream side of the print engine to an upstream side of the line sensor;
   the control unit (a) causes the print engine to print the test chart on the colored print sheet, (b) causes the circulation transportation unit to transport the colored print sheet on which the test chart has been printed to the upstream side of the line sensor, and (c) causes the line sensor to detect the color of the test chart; and
   the image processing unit performs color correction of the image to be printed, on the basis of the detected color of the test chart on the colored print sheet so as to restrain the color change.

3. The image forming apparatus according to claim 2 wherein
   the print engine is arranged in one of an upward part of the transportation path and a downward part of the transportation path;
   the line sensor is arranged in the other of the upward part of the transportation path and the downward part of the transportation path; and
   the circulation transportation unit transports the print sheet from the downstream side of the print engine to the upstream side of the line sensor with changing an orientation of the print sheet in a switch back manner.

4. An image forming apparatus, comprising:
   a print engine configured to physically print an image to be printed on a print sheet;
   a sheet transportation unit configured to transport the print sheet along a predetermined transportation path;
   an optical sensor arranged so as to face the transportation path, and configured to detect a color of a test chart on a colored print sheet transported along the transportation path; said test chart being comprised of patch images of plural gradation levels for a toner color;
   a control unit;
   a storage device configured to store a surface color correction table and a reference color data that indicates a reference color of the test chart; the reference color data containing reference colors corresponding to the plural gradation levels of each toner color; and
   an image processing unit configured to perform color correction of the image to be printed on the colored print sheet, on the basis of the detected color of the test chart on the colored print sheet so as to restrain color change of the image due to a surface color of the colored print sheet; wherein the image processing unit (a) determines a color correction characteristic corresponding to the detected color of the test chart in accordance with the surface color correction table that indicates a relationship between a color of the test chart and a color correction characteristic, and (b) performs the color correction in accordance with the determined color correction characteristic; (c) generates a new surface color correction table on the basis of the detected color of the test chart and the reference color; (d) calculates a difference value between the new surface color correction table and the stored surface color correction table; and (e) renews the surface color correction table stored by the storage device with the newly generated surface color correction table when the difference value is higher than a predetermined value.

5. The image forming apparatus according to claim 4 wherein the difference value calculated is a total of the differences for the plural gradation levels as between the new surface color correction table and the stored surface color correction table.

6. The image forming apparatus according to claim 4 wherein the difference value calculated is a largest value of the differences for the plural gradation levels as between the new surface color correction table and the stored surface color correction table.

\* \* \* \* \*